(12) United States Patent
Chen

(10) Patent No.: US 8,866,804 B2
(45) Date of Patent: Oct. 21, 2014

(54) PIXEL STRUCTURE AND A DRIVING METHOD THEREOF

(75) Inventor: Chenghung Chen, Shenzhen (CN)

(73) Assignee: Shenzhen China Star Optoelectronics Technology, Co. Ltd., Shenzhen (CN)

( * ) Notice: Subject to any disclaimer, the term of this patent is extended or adjusted under 35 U.S.C. 154(b) by 253 days.

(21) Appl. No.: 13/146,471

(22) PCT Filed: Jun. 1, 2011

(86) PCT No.: PCT/CN2011/075130
§ 371 (c)(1),
(2), (4) Date: Jul. 27, 2011

(87) PCT Pub. No.: WO2012/145948
PCT Pub. Date: Nov. 1, 2012

(65) Prior Publication Data
US 2012/0274618 A1    Nov. 1, 2012

(30) Foreign Application Priority Data

Apr. 29, 2011    (CN) .......................... 2011 1 0110572

(51) Int. Cl.
*G06F 3/038*    (2013.01)
*G09G 5/00*    (2006.01)
*G09G 3/36*    (2006.01)
*G09G 3/18*    (2006.01)

(52) U.S. Cl.
CPC . *G06F 3/038* (2013.01); *G09G 3/36* (2013.01)
USPC ................. 345/208; 345/92; 345/89; 345/88; 345/90; 345/50; 345/87

(58) Field of Classification Search
CPC ..... G09G 3/18; G09G 3/3696; G09G 3/3607; G09G 3/3648; G09G 3/20; G09G 2310/02; G09G 2310/0202; G09G 2310/0262; G09G 2310/0248; G09G 2310/0251; G02F 1/13; G02F 1/133
USPC ...................... 345/208, 92, 89, 88, 90, 50, 87
See application file for complete search history.

(56) References Cited

U.S. PATENT DOCUMENTS

2005/0259703 A1*  11/2005  You et al. .................... 372/38.07
(Continued)

FOREIGN PATENT DOCUMENTS

| CN | 1632853 A | 6/2005 |
| CN | 101109878 A | 1/2008 |
| CN | 101149548 A | 3/2008 |

(Continued)

*Primary Examiner* — Aneeta Yodichkas
(74) *Attorney, Agent, or Firm* — Mark M. Friedman

(57) ABSTRACT

A first transistor comprises a gate coupled to a first scan line, a source coupled to a data line, and a drain coupled to the first storage capacitor. The second transistor comprises a gate coupled to a second scan line, a source coupled to the first storage capacitor, and a drain coupled to the second storage capacitor. A first polarity voltage applied on the data line is stored into the first storage capacitor during a first time period which the first transistor is turned on. The first storage capacitor discharges due to a connection between the first capacitor and the second capacitor during a second time period which the second transistor is turned on. By using such driving method, the difference in voltage between the liquid crystal capacitor and a common voltage is reduced from charge sharing for improving a color washout effect of the LCD panel.

11 Claims, 7 Drawing Sheets

(56) References Cited

U.S. PATENT DOCUMENTS

| | | |
|---|---|---|
| 2008/0062340 A1 | 3/2008 | Um et al. |
| 2008/0136983 A1* | 6/2008 | Huang ............................. 349/38 |
| 2008/0158211 A1* | 7/2008 | Kwon ........................... 345/207 |
| 2008/0259234 A1 | 10/2008 | Lin et al. |

FOREIGN PATENT DOCUMENTS

| | | |
|---|---|---|
| CN | 101231434 A | 7/2008 |
| CN | 101290438 | 10/2008 |
| CN | 101493623 A | 7/2009 |
| CN | 101727837 A | 6/2010 |

\* cited by examiner

US 8,866,804 B2

PIXEL STRUCTURE AND A DRIVING METHOD THEREOF

BACKGROUND OF THE INVENTION

1. Field of the Invention

The present invention relates to a pixel structure and a driving method thereof, and more particularly, to a pixel structure used to minimize color washout effect and a driving method thereof.

2. Description of the Prior Art

An advanced monitor with multiple functions is an important feature for use in current consumer electronic products. Liquid crystal displays (LCDs) which are colorful monitors with high resolution are widely used in various electronic products such as monitors for mobile phones, personal digital assistants (PDAs), digital cameras, laptop computers, and notebook computers.

Thin-film-transistor liquid crystal displays (TFT-LCDs) have gradually become mainstream products in the consumer electronics market, for they have many merits such as high picture quality, efficient utilization of space, low consumption power, no radiation, etc. Referring to FIG. 1 showing an equivalent circuit diagram of a pixel unit 100 on a conventional LCD panel, the pixel units 100 on the LCD panel corresponds to a scan line G(m), a data line D(n), and a common line C(m). Also, the unit 100 comprises a thin film transistor (TFT) T, a liquid crystal (LC) capacitor $C_{LC}$, and a storage capacitor $C_{ST}$. The TFT T controls conduction and disconnection according to a scan signal through the scan line G(m). When the scan signal is at a high voltage level, the TFT T turns on, causing data voltage applied on the data line D(n) to be delivered to the LC capacitor $C_{LC}$ and to the storage capacitor $C_{ST}$, so that the LC capacitor $C_{LC}$ and the storage capacitor $C_{ST}$ are charged.

Referring to FIG. 2, FIG. 2 illustrates a waveform diagram of a scan signal applied on the pixel unit 100 shown in FIG. 1. The LCD panel comprises a plurality of pixel units 100, and each of the plurality of pixel units 100 corresponds to one of the scan lines G(m−1)~G(m+1) and to one of the data lines D(n−1)~D(n+1), respectively, as FIG. 2 shows. For brevity, the common line connected to each of the plurality of pixel units 100 is omitted in FIG. 2. Scan signals transmitted through each of the scan lines G(m−1)~G(m+1) are generated sequentially. In other words, the scan signals are sequentially input to the neighboring scan lines G(m−1)~G(m+1), so that the scan signals applied on the neighboring scan lines G(m−1)~G(m+1) sequentially correspond to the high voltage level, causing the TFT T in the pixel unit 100 to conduct. Data voltage is stored in the storage capacitor $C_{ST}$ and in the LC capacitor $C_{LC}$ corresponding to the pixel unit 100 row by row through the data lines D(n−1)~D(n+1) and thereby a desired gray level is shown.

Currently, LCDs with a high contrast ratio, a swift response time, and a wide viewing angle are designed in accordance with the needs of the market. LCDs with a wide viewing angle can be designed with the technology like multi-domain vertically alignment (MVA), multi-domain horizontal alignment (MHA), twisted nematic plus wide viewing film (TN+film), and in-plane switching (IPS). Although the MVA technology can be implemented on TFT-LCDs to make the TFT-LCDs with a wide viewing angle, a problem of color washout occurs, which is blamed by the public. The color washout is that an image displayed on a LCD panel shows different colors in different sights of viewing angles. For instance, a user may see an image with a whiter color when his/her sight is at a more slanted angle with respect to the LCD panel.

Referring to FIG. 3, FIG. 3 is an equivalent circuit diagram showing a pixel unit 400 having a function of compensation for color washout according to conventional technology. The pixel unit 400 corresponds to two scan lines G1(m) and G2(m), a common line C(m), and a data line D(n). Further, the pixel unit 400 is divided into two pixel parts 400a and 400b. Each of the pixel parts 400a and 400b basically comprises the pixel unit 100 shown in FIG. 1. To be more specific, the pixel part 400a comprises a transistor S1, an LC capacitor $C_{LC1}$, and a storage capacitor $C_{ST1}$. The pixel part 400b comprises a transistor S2, an LC capacitor $C_{LC2}$, and a storage capacitor $C_{ST2}$. The pixel part 400a and the pixel part 400b correspond to the scan line G1(m) and the scan line G2(m), respectively.

Referring to FIG. 4, FIG. 4 illustrates waveforms of the scan signal applied on the pixel units 400a and 400b shown in FIG. 3. The LCD panel comprises a plurality of pixel units 400. For brevity, the common line C(m) is omitted in FIG. 4. Each of the plurality of pixel units 400 comprises two pixel parts 400a and 400b, as shown in FIG. 4.

The driving method of driving the pixel unit 400 is similar to that of driving the pixel unit 100. Scan signals are sequentially input to the neighboring scan lines G1(m)~G2(m+1), so that the neighboring scan lines G1(m)~G2(m+1) sequentially correspond to a high voltage level in an order of G1(m)→G2(m)→G1(m+1)→G2(m+1), causing the TFTs in the pixel unit 400 to conduct. Data voltage is stored in the storage capacitors $C_{ST1}$ and $C_{ST2}$ and in the LC capacitors $C_{LC1}$ and $C_{LC2}$ corresponding to the pixel unit 400 column by column through the data lines D(n−1)~D(n+1) and thereby a correct frame is shown. Obviously, the method has a problem of doubling the number of the scan lines, causing the valid charging duration to be reduced to half the original one. Thus, such kind of technology is unable to be implemented in an LCD having a higher frame rate due to insufficient charging duration.

In addition, the received digital image data carried by data voltage transmitted through the data lines D(n−1)~D(n+1) has to be transformed into analog data voltage by using a gamma circuit. Practically, the analog data voltage corresponds to different gray levels. When the pixel unit 400 receives scan signals, the pixel unit 400 drives LC molecules to display different gray levels in accordance with the analog data voltage transmitted through the data line. Since each of the plurality of pixel units 400 comprises two pixel parts 400a and 400b and gray levels of the two pixel parts 400a and 400b are required to be different in this technology, color washout can be solved even though a user sees on the LCD panel at different viewing angles. The reason why color washout can be solved is that the two different gray levels are complementary. However, the digital image data is input to two gamma circuits at the same time, and then the pixel parts 400a and 400b respectively receive different kinds of analog data voltage to increase flexibility of color correction in this pixel structure. An overall manufacturing cost of the circuit is increased due two gamma circuits used. Therefore, there is a need for a new pixel driving structure for solving the problem mentioned above.

SUMMARY OF THE INVENTION

An object of the present invention is to provide a pixel structure where no additional gamma circuit needs to be disposed for minimizing color washout and a driving method thereof, and further to reduce manufacturing cost due to an additional gamma circuit used in the conventional technology.

According to the present invention, a pixel structure comprising a first scan line, a second scan line, and a data line is provided. The pixel structure further comprises a first storage capacitor, a second storage capacitor, a first transistor, and a second transistor. The first storage capacitor comprises a first terminal and a second terminal, the first terminal coupled to a common line. The second storage capacitor comprises a first terminal and a second terminal, the first terminal coupled to the common line. The first transistor which comprises a first gate, a first source, and a first drain is used for conducting the data line and the first storage capacitor. The first gate of the first transistor is coupled to a first scan line. The first source and the first drain of the first transistor are coupled to a data line and to the second terminal of the first storage capacitor, respectively. The second transistor comprises a second gate, a second source, and a second drain. The second gate of the second transistor is coupled to a second scan line. The second source and the second drain of the second transistor are coupled to the second terminal of the first storage capacitor and to the second terminal of the second storage capacitor, respectively. A first polarity voltage applied on the data line is stored into the first storage capacitor during a first time period which the first transistor is turned on. The first storage capacitor discharges due to a connection between the first capacitor and the second capacitor during a second time period which the second transistor is turned on.

According to the present invention, a method of driving a pixel is provided. The method comprises the steps of providing a pixel structure comprising a first scan line, a second scan line, and a data line, a first storage capacitor coupled to a common line via a first transistor, and a second storage capacitor one terminal coupled to the common line and the other terminal coupled to the first transistor via a second transistor; outputting a scan signal through the first scan line to the first transistor, so that a first polarity voltage applied on the data line is stored into the first storage capacitor during a first time period; outputting a scan signal through the second scan line to the second transistor, so that the first storage capacitor discharges due to a connection between the first capacitor and the second capacitor during a second time period.

In one aspect of the present invention, both of the first transistor and the second transistor are thin-film transistors. The first time period does not overlap with the second time period. The first time period is prior to the second time period.

In another aspect of the present invention, the pixel structure further comprises a liquid crystal capacitor, and one terminal of the liquid crystal capacitor is coupled to the second terminal of the first storage capacitor.

In still another aspect of the present invention, the first scan line is coupled to the gate of the first transistor, and the second scan line is coupled to the gate of the second transistor.

In yet another aspect of the present invention, a second polarity voltage applied on the data line is stored into the first storage capacitor during a third time period which the first transistor is turned on, and the first storage capacitor discharges due to a connection between the first capacitor and the second capacitor during a fourth time period which the second transistor is turned on. The second time period is prior to the third time period, and the third time period is prior to the fourth time period. The polarity of the first polarity voltage is contrary to that of the second polarity voltage.

In contrast to the prior art, the pixel structure comprises two TFTs, an LC capacitor, a first storage capacitor, and a second storage capacitor according to the present invention. The two TFTs are connected to two scan lines, respectively, for conducting at different timings. When conducting, one of the TFTs stores data voltage applied on the data line into the first storage capacitor and into the LC capacitor. While the other TFT conducts, it conducts the first storage capacitor and second storage capacitor, allowing the first and second storage capacitors to perform charge sharing. Owing to the driving method, the difference in voltage between the LC capacitor and common voltage is reduced from charge sharing and further, a color washout effect of the panel is minimized.

These and other features, aspects and advantages of the present disclosure will become understood with reference to the following description, appended claims and accompanying figures.

DETAILED DESCRIPTION OF THE PREFERRED EMBODIMENTS

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 1:
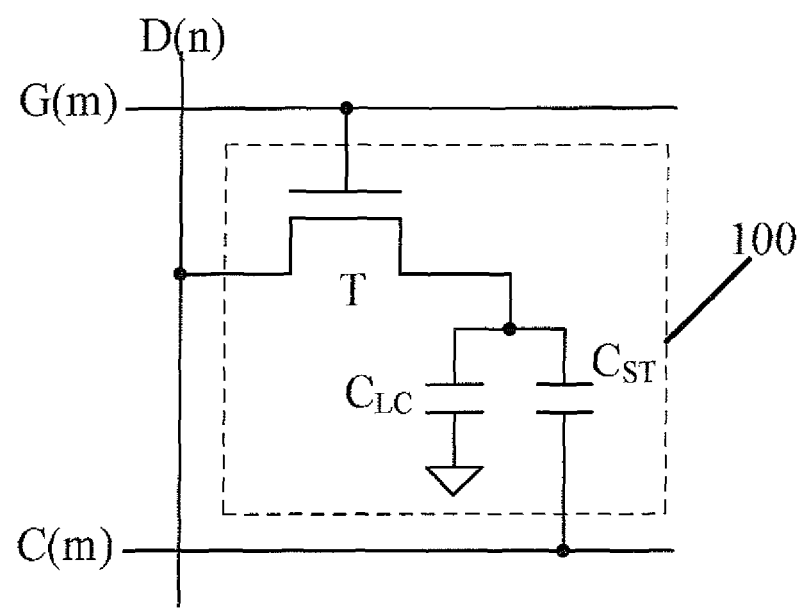
FIG. 1 shows an equivalent circuit diagram of a pixel unit on a conventional LCD panel
Figure 2:
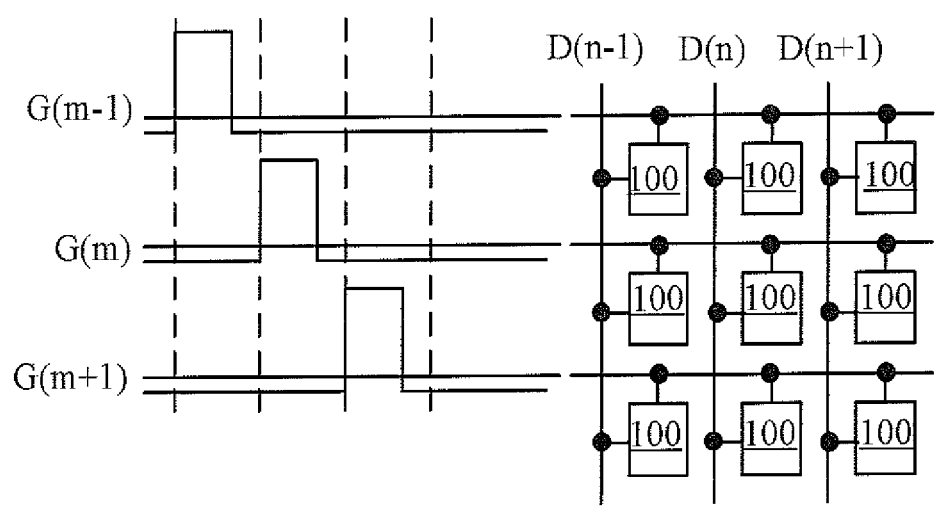
FIG. 2 illustrates a waveform diagram of a scan signal applied on the pixel unit shown in FIG. 1.
Figure 3:
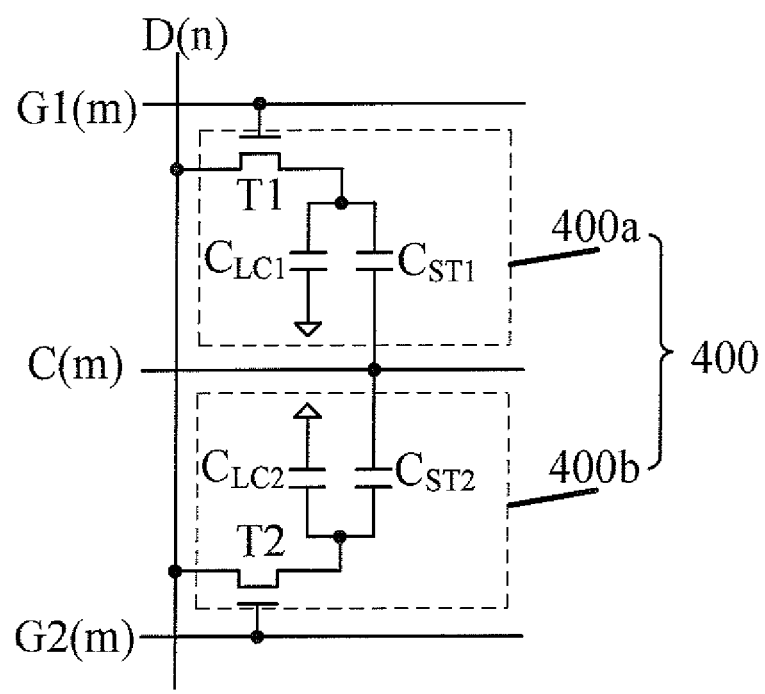
FIG. 3 is an equivalent circuit diagram showing a pixel unit having a function of compensation for color washout according to conventional technology.
Figure 4:
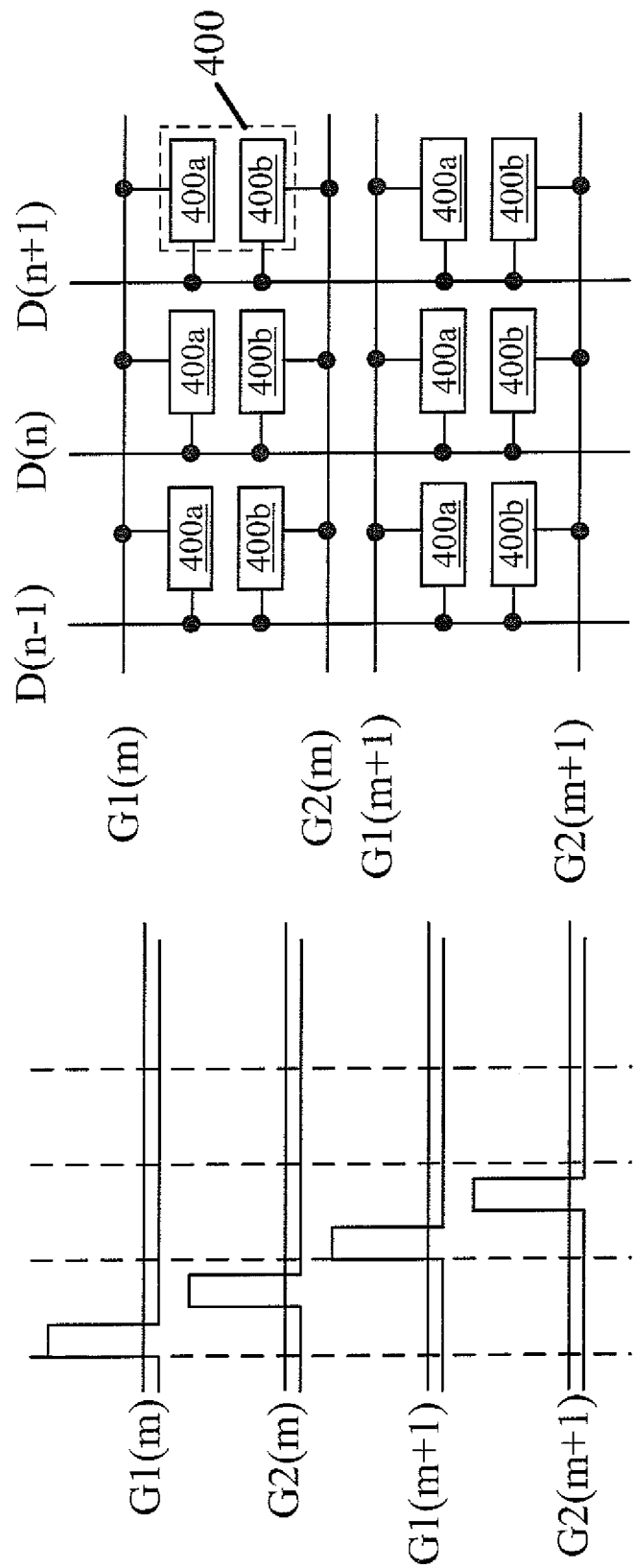
FIG. 4 illustrates waveforms of the scan signal applied on the pixel units and shown in FIG. 3.
Figure 5:
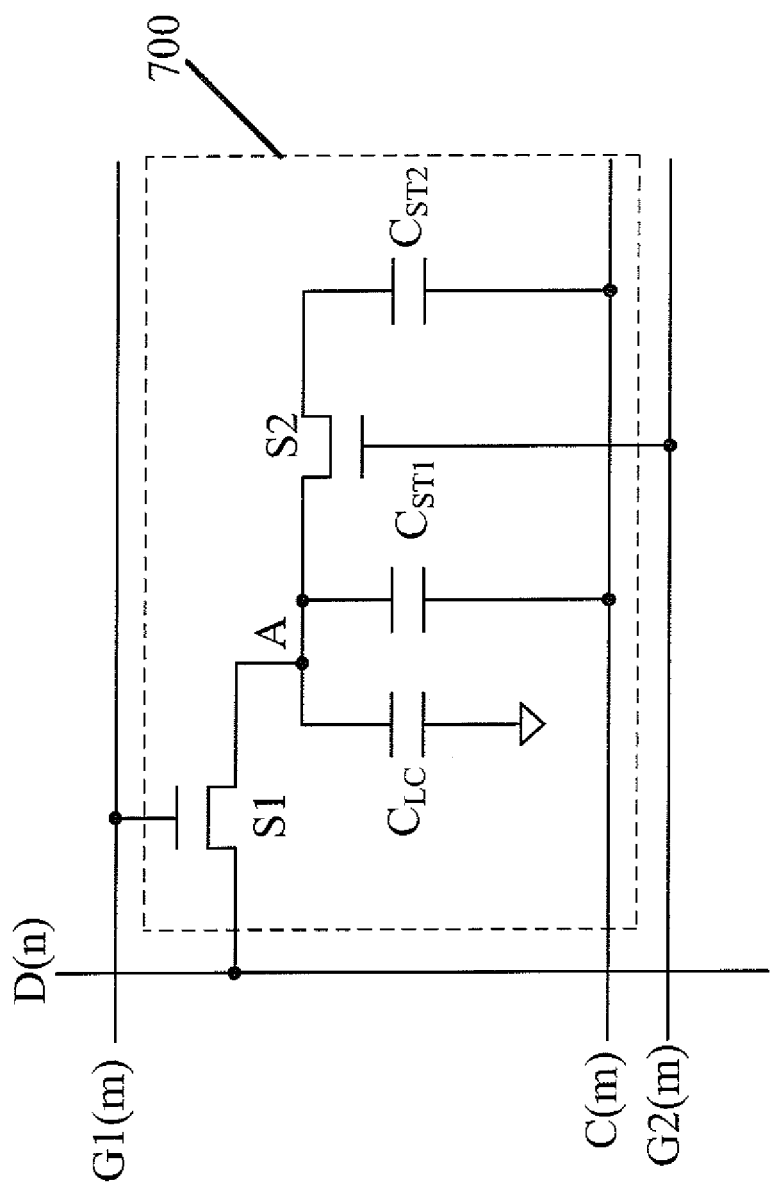
FIG. 5 is an equivalent circuit diagram of a pixel unit according to an embodiment of the present invention.

Referring to FIG. 5, FIG. 5 is an equivalent circuit diagram of a pixel unit 700 according to an embodiment of the present invention. The pixel unit 700 comprises a first TFT S1, a second TFT S2, a first storage capacitor $C_{ST1}$, a second storage capacitor $C_{ST2}$, and an LC capacitor $C_{LC}$. The first TFT S1 corresponds to a first scan line G1(m), and the second TFT S2 corresponds to a second scan line G2(m).

The first TFT S1 comprises a gate coupled to the first scan line G1(m), a source coupled to a data line D(n), and a drain coupled to a node A. The second TFT S2 comprises a gate coupled to the second scan line G2(m), a source coupled to the node A, and a drain coupled to the storage capacitor $C_{ST2}$. One terminal of the storage capacitor $C_{ST1}$ is coupled to the node A and the other terminal is coupled to a common line C(m). One terminal of the storage capacitor $C_{ST2}$ is also coupled to the common line C(m) and the other terminal is coupled to the drain of the TFT S2. One terminal of the LC capacitor $C_{LC}$ is coupled to the node A and the other terminal is coupled to the ground. The common line C(m) outputs common voltage Vcom. The first TFT S1 and the second TFT S2, serving as switches, are turned on using signals transmitted through the scan lines G1(m) and G2(m) in the present embodiment. A detailed driving method of the pixel unit 700 is provided hereafter.

Figure 6:
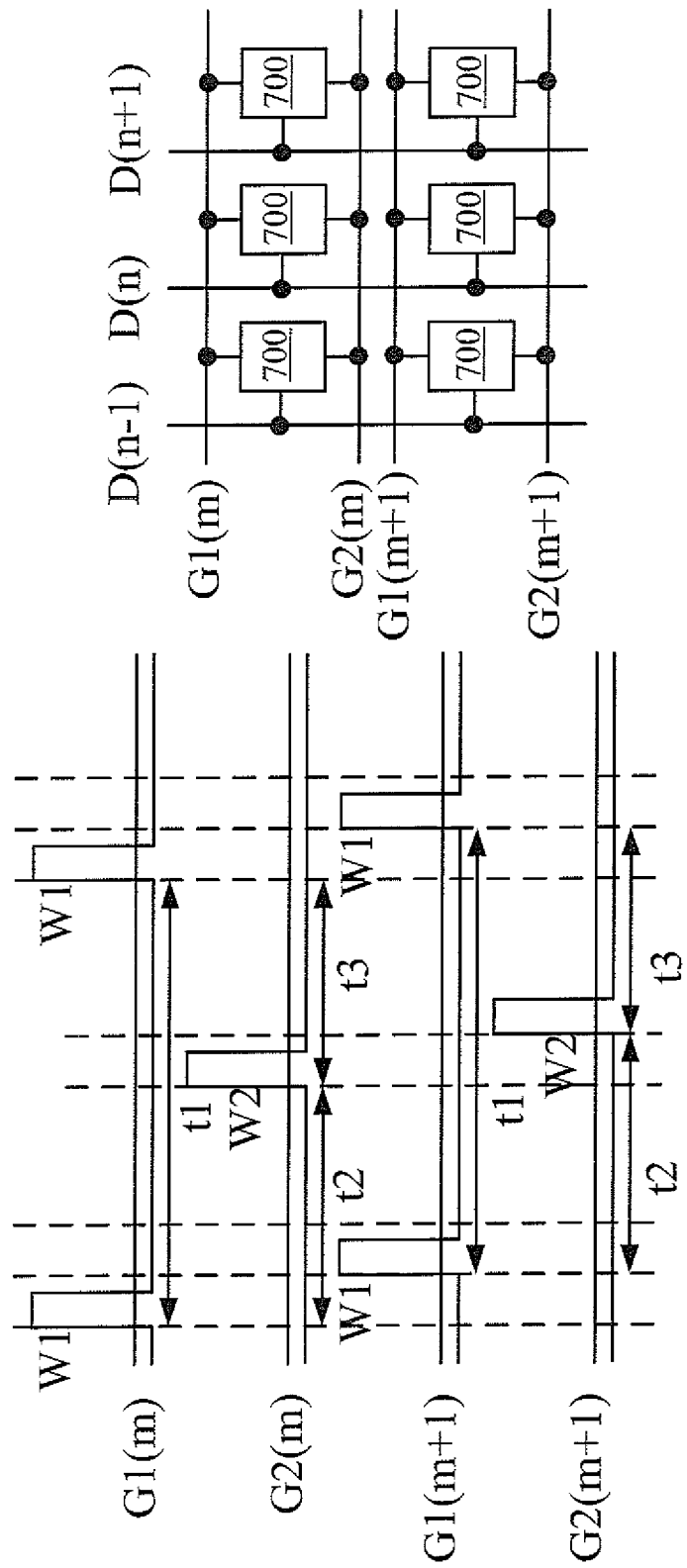
FIG. 6 illustrates a waveform diagram of a scan signal in the pixel units shown in FIG. 5.

Referring to FIG. 6, FIG. 6 illustrates a waveform diagram of a scan signal in the pixel units 700 shown in FIG. 5, where m represents the mth row, m+1 represents the (m+1)th row, and so forth, and n represents the nth column, n+1 represents the (n+1)th column, and so forth. The scan signal applied on the neighboring scan lines G1(m) and G2(m) does not achieve a high voltage level sequentially; instead, the scan signal applied on the neighboring scan lines G1(m) and G2(m) are used to driving two driving groups. The driving order of the first driving group is G1(m−1)→G1(m)→G1(m+1); the driving order of the second driving group is G2(m−1)→G2(m)→G2(m+1). The two groups are scanned at the same frame rate. In other words, an interval t1 in the figure represents a period during which scan signals are transmitted through the first scan line G1(m). W1 represents a first time period at which pulses of scan signals transmitted through the scan line G1(m) turn on the transistor. The interval t1 is determined by the frame rate of the panel. For example, the interval t1 is 1/60 second when the frame rate is 60 Hz. On the other hand, an interval t2 represents the time difference between a period during which scan signals are transmitted through the second scan line G2(m) and a period during which scan signals are transmitted through the first scan line G1(m) in a pixel unit. W2 represents a second time period at which pulses of scan signals transmitted through the scan line G2(m) turn on the transistor. The interval t2 has to be smaller than the interval t1, and the period of the second time period W2 has to be the same as that of the first time period W1 (because the first time period W1 and the second time period W2 may overlap during different periods of time) to ensure that scan signals do not be transmitted through the first scan line G1(m) and through the second scan line G2(m) at the same time. In other words, the first time period W1 at which scan signals are transmitted through the scan line G1(m) does not overlap with the second time period W2 at which scan signals are transmitted through the scan line G2(m), and the first time period W1 is prior to the second time period W2. The first time period W1 and the second time period W2 correspond to the same pixel unit 700.

The main object of the design is to ensure that two gray levels are shown over an interval t1 for the pixel unit 700. Both of the gray levels are supplemented mutually, so no color washout occurs no matter at what angle a user sees on the panel. This ensures that good image quality is maintained. In addition, color washout and brightness of the panel can both be controlled by adjusting the driving timing of the two driving groups.

Figure 7:
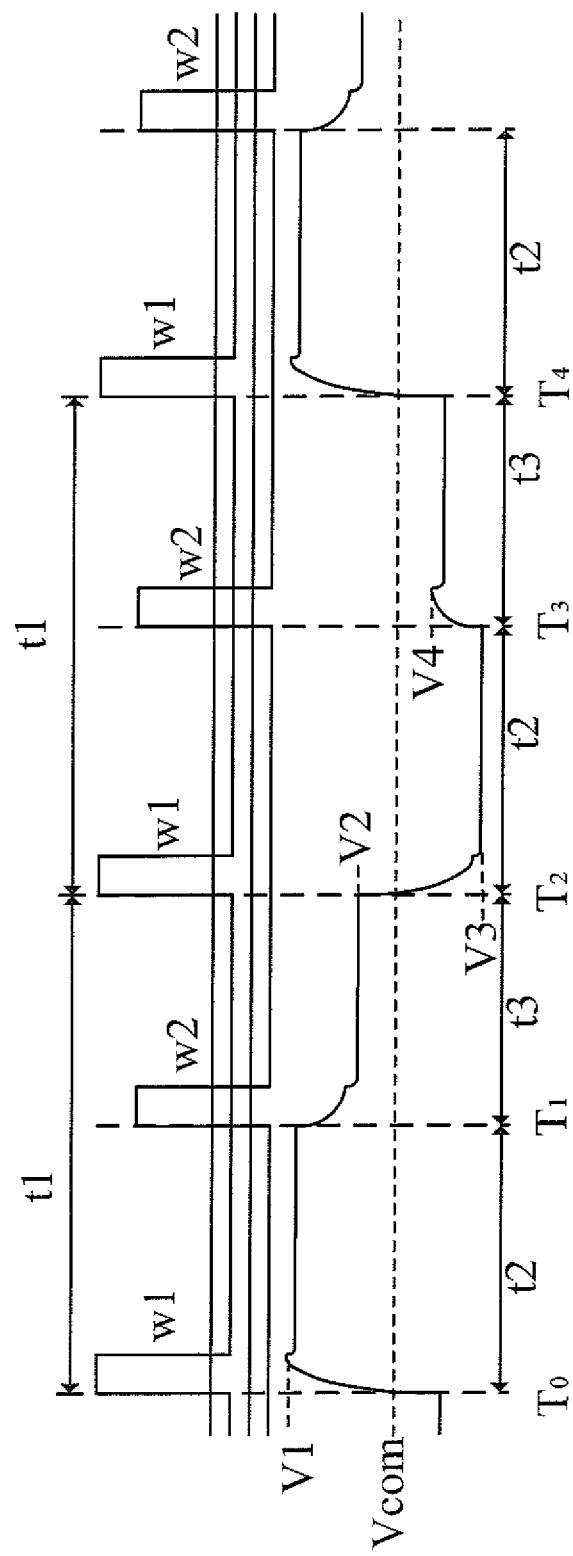
FIG. 7 is a timing diagram showing that the voltage level applied on the node A varies with time.

Please refer to FIG. 5 to 7. FIG. 7 is a timing diagram showing that the voltage level applied on the node A varies with time. As FIG. 7 shows, the transistor S1 in FIG. 6 conducts when scan signals are transmitted through the scan line G1(m) (corresponding to the time period W1 in FIGS. 6 and 7), so that both of the LC capacitor $C_{LC}$ and the storage capacitor $C_{ST1}$ are charged with the voltage applied on the data line D(n). At the subsequent time period W2, the transistor S2 in FIG. 6 conducts when scan signals are transmitted through the scan line G2(m) (referring to the time period W2 in FIGS. 6 and 7), so that the pixel unit 700 is charged with the voltage contained in the storage capacitor $C_{ST2}$. In another aspect, charge sharing is performed between the storage capacitor $C_{ST1}$ and the storage capacitor $C_{ST2}$.

Each of the plurality of pixel units 700 receives data voltage having positive and negative polarities alternatively. The data voltage having a positive polarity means that the data voltage is larger than the common voltage Vcom. Contrarily, the data voltage having a negative polarity means that the data voltage is smaller than the common voltage Vcom. It means that the pixel unit 700 receives the data voltage having a positive polarity at time $T_0$, receives the data voltage having a negative polarity at time $T_2$, and receives the data voltage having a positive polarity at time $T_4$.

During the period $T_0$-$T_1$, the first TFT S1 is turned on in response to the pulse W1 of the scan signal transmitted through the scan line G1(m), the data voltage having a positive polarity is transmitted to the storage capacitor $C_{ST1}$ and to the LC capacitor $C_{LC}$ through the data line D(n) via the conducting first TFT S1, causing the voltage applied on the node A to become the voltage level V1 according to the data voltage. Meanwhile, the alignment of the LC molecules contained in the LC capacitor $C_{LC}$ is adjusted according to the voltage level V1. Subsequently, during the interval $T_1$-$T_2$, the second TFT S2 is turned on in response to the pulse W2 of the scan signal transmitted through the scan line G2(m), voltage across the storage capacitor $C_{ST1}$ is shared with the storage capacitor $C_{ST2}$ via the second TFT S2, causing the voltage applied on the node A to become a lower voltage level V2, that is, V2=V1×$C_{ST1}$/($C_{ST1}$+$C_{ST2}$). So the alignment of the LC molecules contained in the LC capacitor $C_{LC}$ is adjusted according to the voltage level V2. During the period $T_2$-$T_3$, the first TFT S1 is turned on in response to the pulse W1 of the scan signal (i.e., the first time period W1) transmitted through the scan line G1(m), the data voltage having a negative polarity is transmitted to the storage capacitor $C_{ST1}$ and the LC capacitor $C_{LC}$ through the data line D(n) via the turned-on first TFT S1, causing the voltage applied on the node A to become the voltage level V3 according to the data voltage. Meanwhile, the alignment of the LC molecules contained in the LC capacitor $C_{LC}$ is adjusted according to the voltage level V3. Subsequently, during the period $T_3$-$T_4$, the second TFT S2 is turned on in response to the pulse W2 of the scan signal (i.e., the second time period W2) transmitted through the scan line G2(m), delta voltage of the storage capacitor $C_{ST1}$ is shared with the storage capacitor $C_{ST2}$ via the second TFT S2, causing the voltage of the node A to become a lower voltage level V4, that is, V4=V3×$C_{ST1}$/($C_{ST1}$+$C_{ST2}$). So the alignment of the LC molecules contained in the LC capacitor $C_{LC}$ is adjusted according to the voltage level V4. It is notified that the transistor S2 is turned on in response to the pulse W2, and the polarity of the voltage stored in the storage capacitor $C_{ST2}$ is always contrary to that applied on the pixel. When any pixel unit is driven, the polarities of the voltage of two pixels in neighboring frames are positive and negative in turns. For instance, the voltage across the storage capacitor $C_{ST1}$ of the pixel 700 is at a high voltage level while the voltage across the storage capacitor $C_{ST2}$ of the pixel 700 remains at a low voltage level since the previous frame, when the first frame is shown during the period $T_0$-$T_2$. The storage capacitor $C_{ST1}$ is at a low voltage level while the storage capacitor $C_{ST2}$ remains at a high voltage level since the first frame, when the second frame is shown during the period $T_2$-$T_4$. The voltage level V3 applied on the node A is negative polarity (smaller than the common voltage Vcom) and the voltage level V2 applied on the storage capacitor $C_{ST2}$ is positive polarity (larger than the common voltage Vcom) at time $T_3$. Thus, once the pulse W2 generated by scan signal transmitted through the scan line G2(m) turns on the second TFT S2, the voltage applied on the node A is raised to the voltage level V4 because the storage capacitor $C_{ST1}$ and the storage capacitor $C_{ST2}$ share charges. In this way, the voltage applied on the LC capacitor $C_{LC}$ (i.e., the level applied on the node A) is lowered while the transistor S2 is turned on, causing the difference in voltage between the LC capacitor $C_{LC}$ and the common voltage Vcom to be reduced for a while (the interval t3).

Since a pixel unit 700 shows two different gray levels in a frame rate (1/60 of a second), the driving method can solve the problem of color washout occurring on the panel. In addition, there is no need for an additional gamma circuit in the pixel unit 700, which means that color washout occurring in the panel can be solved successfully without additional cost by using the pixel unit 700 and a driving method thereof according to the present invention.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A pixel structure, comprising a first scan line, a second scan line, and a data line, characterized in that: the pixel structure further comprises:
   a first storage capacitor, comprising a first terminal and a second terminal, the first terminal coupled to a common line;
   a second storage capacitor, comprising a first terminal and a second terminal, the first terminal coupled to the common line;
   a first transistor, comprising a first gate, a first source, and a first drain, the first gate coupled to a first scan line, the first source and the first drain coupled to a data line and to the second terminal of the first storage capacitor, respectively, for conducting the data line and the first storage capacitor; and
   a second transistor, comprising a second gate, a second source, and a second drain, the second gate coupled to a second scan line, the second source and the second drain coupled to the second terminal of the first storage capacitor and to the second terminal of the second storage capacitor, respectively;
   wherein a first polarity voltage applied on the data line is stored into the first storage capacitor during a first time period which the first transistor is turned on, and the first storage capacitor discharges due to a connection between the first capacitor and the second capacitor during a second time period which the second transistor is turned on;
   a second polarity voltage applied on the data line is stored into the first storage capacitor during a third time period which the first transistor is turned on, and the first storage capacitor discharges due to a connection between the first storage capacitor and the second storage capacitor during a fourth time period which the second transistor is turned on;
   a polarity of the first polarity voltage is contrary to that of the second polarity voltage.

2. The pixel structure of claim 1, characterized in that: both of the first transistor and the second transistor are thin-film transistors.

3. The pixel structure of claim 1, characterized in that: the first time period does not overlap with the second time period.

4. The pixel structure of claim 3, characterized in that: the first time period is prior to the second time period.

5. The pixel structure of claim 1, characterized in that: the pixel structure further comprises a liquid crystal capacitor, and one terminal of the liquid crystal capacitor is coupled to the second terminal of the first storage capacitor.

6. The pixel structure of claim 1, characterized in that: the second time period is prior to the third time period, and the third time period is prior to the fourth time period.

7. A method of driving a pixel, characterized in that: the method comprises the steps of:
   providing a pixel structure comprising a first scan line, a second scan line, and a data line, a first storage capacitor coupled to a common line via a first transistor, and a second storage capacitor one terminal coupled to the common line and the other terminal coupled to the first transistor via a second transistor;
   outputting a scan signal through the first scan line to the first transistor, so that a first polarity voltage applied on the data line is stored into the first storage capacitor during a first time period; and
   outputting a scan signal through the second scan line to the second transistor, so that the first storage capacitor discharges due to a connection between the first capacitor and the second capacitor during a second time period;
   outputting a scan signal through the first scan line to the first transistor, so that a second polarity voltage applied on the data line is stored into the first storage capacitor during a third time period wherein a polarity of the first polarity voltage is contrary to that of the second polarity voltage; and
   outputting a scan signal through the second scan line to the second transistor, so that the first storage capacitor discharges due to a connection between the first storage capacitor and the second storage capacitor during a fourth time period.

8. The method of driving a pixel of claim 7, characterized in that: the first time period does not overlap with the second time period.

9. The method of driving a pixel of claim 8, characterized in that: the first time period is prior to the second time period.

10. The method of driving a pixel of claim 7, characterized in that: both of the first transistor and the second transistor are thin-film transistors.

11. The method of driving a pixel of claim 7, characterized in that: the second time period is prior to the third time period, and the third time period is prior to the fourth time period.

* * * * *